United States Patent [19]
Nishiwaki et al.

[11] Patent Number: 4,733,042
[45] Date of Patent: Mar. 22, 1988

[54] WELDING CONTROL APPARATUS INCLUDING A PRESSURE REGULATING VALVE OPERATED IN ACCORD WITH PREDETERMINED SCHEDULE OF VARIATIONS OF A WELDING FORCE CONTROL VARIABLE

[75] Inventors: Toshihiro Nishiwaki; Shozo Yamaguchi, both of Kanagawa, Japan

[73] Assignee: Obara Corporation, Tokyo, Japan

[21] Appl. No.: 21,377

[22] Filed: Mar. 3, 1987

[30] Foreign Application Priority Data

Sep. 22, 1986 [JP] Japan .................................. 61-221777

[51] Int. Cl.⁴ .............................................. B23K 11/00
[52] U.S. Cl. ...................................... 219/89; 219/86.7; 219/117.1
[58] Field of Search ...................... 219/89, 110, 117.1, 219/86.7

[56] References Cited

U.S. PATENT DOCUMENTS 4,135,076 1/1979. Beneteau .............................. 219/89
4,442,337 4/1984 Nakata et al. ........................ 219/110

Primary Examiner—Clifford C. Shaw
Attorney, Agent, or Firm—Flynn, Thiel, Boutell, & Tanis

[57] ABSTRACT

A welding machine controller for controlling the welding operation of a welding machine controls welding force applied to a workpiece by directly controlling a pressure regulating valve which regulates the pressure of working fluid supplied to a power cylinder for applying a welding force to the workpiece. The welding machine controller further controls squeeze time, welding time, hold time, OFF time, cooling time and welding current. The welding force is regulated in a single step or in a plurality of steps during one welding cycle according to the quality and/or thickness of the workpiece.

11 Claims, 4 Drawing Figures

| SQ | WE | HO | OF | CO | CU | PC |

| SQ | WE | HO | OF | CO | CU | ∇C |

WELDING CONTROL APPARATUS INCLUDING A PRESSURE REGULATING VALVE OPERATED IN ACCORD WITH PREDETERMINED SCHEDULE OF VARIATIONS OF A WELDING FORCE CONTROL VARIABLE

BACKGROUND OF THE INVENTION

1. Field of the Invention

The present invention relates to a welding machine controller, and more specifically, to the control elements of a welding machine controller for a resistance welding machine.

2. Description of the Prior Art

The welding mode of a resistance welding machine needs to be changed according to the quality of the workpiece. Accordingly, the welding operation of the resistance welding machine is controlled by a step control program for carrying out satisfactory welding operation meeting the quality of the workpiece. As shown in FIG. 3, controlled variables to be controlled at each step of the control program are squeeze time SQ, welding time WE, hold time HO, OFF time OF, cool time CO, welding current CU, and changeover valve control variables VC. These controlled variables are determined in consideration of the quality of the workpiece.

FIG. 4 illustrates the constitution of a conventional welding machine equipped with such a controller. Referring to FIG. 4, a resistance welding machine 1 has a welding transformer 2 and a controller 3. A squeeze time SQ, a welding time WE, a hold time HO, an OFF time OF, a cool time CO, a welding current CU, and changeover valve control variables VC for each step of the control program are given to the controller 3. The controller 3 provides control signals for controlling the intermittent supply of a welding current to the welding machine 1 and for properly controlling the supply of working fluid to the power cylinder 5 of the welding machine 1 by controlling a selector valve 4 so that the welding operation is achieved satisfactorily. Also shown in FIG. 4 are a low-pressure valve (reversing valve) 7, a high-pressure valve 8, a compressor 9, and a pressure changeover valve 10.

Pressure to be applied to a workpiece 6 is regulated according to the thickness of the workpiece 6. When the workpiece 6 has a small thickness, the changeover valve control variables VC are determined according to the small thickness, and the corresponding control signal is given through a circuit 11 to the pressure changeover valve 10 so that the pressurized fluid is supplied from the compressor 9 through the low-pressure valve 7, the pressure changeover valve 10 and the selector valve 4 to the upper chamber of the power cylinder 5. Upon the completion of the welding work, the controller 3 gives a signal through a circuit 12 to the selector valve 4 so that the working fluid is supplied to the lower chamber of the power cylinder 5 to separate the electrode of the welding machine from the workpiece 6.

When the workpiece 6 has a large thickness, the changeover valve control variable VC are determined for the large thickness, and the corresponding control signal is given through the circuit 11 to the pressure changeover valve 10 so that the pressurized working fluid is supplied from the compressor 9 through the high-pressure valve 8, the pressure changeover valve 10 and the selector valve 4 to the upper chamber of the power cylinder 5. Upon the completion of the welding work, the controller 3 gives a signal through the circuit 12 to the selector valve 4 so that the working fluid is supplied to the lower chamber of the power cylinder 5 to separate the electrode of the welding machine 1 from the workpiece 6.

Thus, the welding operation is carried out automatically according to the previously determined changeover valve control variables VC in consideration of the possible thicknesses of workpieces, and stored in the controller 3.

The pressure changeover valve 10 may be constituted so as to actuate both the low-pressure valve 7 and the high-pressure valve 8 simultaneously.

It is also possible to change the pressure working on the workpiece during the welding operation. That is, the changeover control variables VC are determined so that the pressure changeover valve 10 is controlled so as to supply the working fluid of a low pressure through the low-pressure valve 7 to the power cylinder 5 for a predetermined time at the initial stage of the welding operation and so as to supply the working fluid of a high pressure through the high-pressure valve 8 to the power cylinder 5 for a predetermined time at the final stage of the welding operation. Thus, at the initial stage of the welding operation, a signal is given to the selector valve 4 so that the pressure of the working fluid supplied from the compressor 9 is reduced to an initial pressure by the low-pressure valve 7, and then the working fluid of the initial pressure is supplied to the upper chamber of the power cylinder 5 through the selector valve 4. After a desired time has passed, another signal corresponding to the changeover valve control variables VC are given through the circuit 11 to the pressure changeover valve 10 to changeover the pressure changeover valve 10 so that the pressure of the working fluid supplied from the compressor 9 is regulated to a final pressure by the high-pressure valve 8, and then the working fluid of the final pressure is supplied through the selector valve 4 to the upper chamber of the power cylinder 5.

Thus, the welding pressure applied to the workpiece is varied in two steps, when necessary.

In the recent welding operation using a robot welding head, it is often that various workpieces are welded successively and that the thickness of the workpiece varies for weld points. Accordingly, the welding force must be varied according to the variation of the thickness of the workpieces. In order to regulate the welding force, the low-pressure valve 7 and the high-pressure valve 8 need to be adjusted. However, the adjustment of the low-pressure valve 7 and the high-pressure valve 8 requires troublesome work and, sometimes, the low-pressure valve 7 and the high-pressure valve 8 are adjusted incorrectly.

Furthermore, when the welding force needs to be regulated in steps, a pressure changeover valve must be provided in addition to a plurality of pressure regulating valves corresponding to the number of steps of welding force regulation, which requires a complicated welding machine controller as well as a large floor area for installing the same.

SUMMARY OF THE INVENTION

Accordingly, it is an object of the present invention to provide a welding machine controller capable of controlling welding pressure control variables in addition to the above-mentioned control variables.

In order to achieve the object of the invention, the present invention provides a welding machine controller capable of controlling welding pressure control variables for directly controlling a pressure regulating valve to regulate the welding force, in addition to controlling squeeze time SQ, welding time WE, hold time HO, OFF time OF, cooling time CO, and welding current CU.

According to the present invention, the welding machine controller 3 controls a welding transformer 2 and a selector valve 4 in an ordinary manner for welding operation. However, since the welding machine controller 3 of the present invention controls welding force control variables PC instead of the changeover valve control variables VC, a pressure regulating valve 13 is controlled by the welding machine controller 3 so that the welding force is regulated according to the control variables PC correspond to the quality and thickness of the workpiece. The current, voltage and pulses applied to the pressure regulating valve 13 are controlled sequentially with time according to the set values of the pressure regulating valve control variables, so that the pressure of the working fluid supplied to the selector valve 4 is controlled automatically. In most cases, the welding force is varied in proportion to the welding current.

The above and other objects, features and advantages of the present invention will become more apparent from the following description taken in conjunction with the accompanying drawings.

DESCRIPTION OF THE PREFERRED EMBODIMENT

Figures 1, 2:
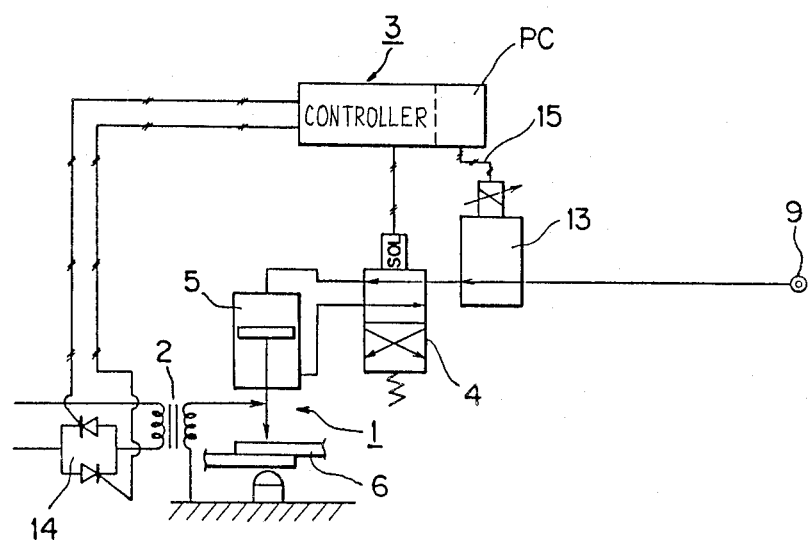
FIG. 1 is a view of assistance in explaining control variables to be controlled by a welding machine controller according to the present invention.
FIG. 2 is a diagrammatic illustration showing the constitution of a welding machine controller, in a preferred embodiment, according to the present invention.
Figures 3, 4:
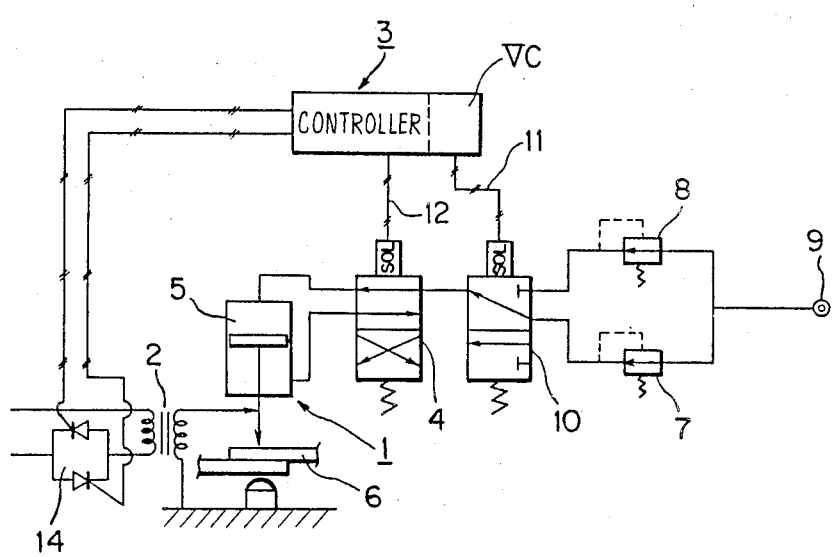
FIG. 3 is a view of assistance in explaining control variables to be controlled by a conventional welding machine controller.
FIG. 4 is a diagrammatic illustration showing the constitution of a conventional welding machine controller.

Referring to FIGS. 1 and 2, a welding machine 1 has a welding transformer 2 and a selector valve 4. A welding machine controller 3 controls the welding transformer 2 through a thyristor 14, and the selector valve 4 to control the welding operation of the welding machine 1.

Data for each step of a step control program for controlling the welding operation of the welding machine 1, including welding force control variables PC for varying the welding force applied to a workpiece 6 by directly controlling a pressure regulating valve 13 through a circuit 15 in addition to the data of squeeze time SQ, welding time WE, hold time HO, OFF time OF, cooling time CO and welding current CU are stored in the welding machine controller 3. Accordingly, the magnitude of the current, voltage or pulses corresponding to the data of the welding force control variables is controlled sequentially with time to control the pressure regulating valve 13.

The pressure of compressed air supplied from a compressor 9 is regulated by the pressure regulating valve 13, and then the compressed air of a regulated pressure is supplied through the selector valve (reversing valve) 4 to the upper chamber of a power cylinder 5 of the welding machine 1 to apply a desired welding force to the workpiece 6 during the welding operation. The welding pressure is regulated according to the variation of the quality and thickness of the workpiece 6. Although the quality and thickness of the workpiece 6 are variable as mentioned above, in most cases, the period of variation of the quality and thickness can be estimated. Accordingly, the magnitude of the current, the voltage of the pulses applied to the pressure regulating valve 13 is varied sequentially with time according to the welding force control variables PC. Consequently, the pressure of the compressed air supplied through the selector valve 4 to the power cylinder 5 is varied in steps according to the quality and thickness of the workpiece.

Thus, according to the present invention, the welding force control variables PC are controlled for the direct control of the pressure regulating valve instead of the pressure changeover valve control variables VC, which are controlled in the conventional welding machine controller. Accordingly, the welding force can be regulated in a plurality of steps simply by controlling the pressure regulating valve, and hence the welding force control system is simplified requiring a small space for installation.

Furthermore, since the welding force is regulated automatically according to the condition of the workpiece, the workpiece can be welded uniformly, simply, easily and accurately.

Still further, the numerical setting of the welding force control variables facilitates accurate and quick setting of the welding force control variables.

Although the invention has been described in its preferred form with a certain degree of particularity, it is to be understood that many variations and changes are possible in the invention without departing from the scope thereof.

What is claimed is:

1. A method for controlling the welding operation of a welding machine having a compressed air supply, a power cylinder to which air under pressure from said compressed air supply is supplied via a reversing valve for reversing said power cylinder, the cylinder being arranged for applying welding force to a work piece, the method comprising:
    interposing a pressure regulating valve between said air supply and reversing valve;
    providing a predetermined schedule of variations of a welding force control variable representing the welding force to be applied to a work piece during at least one weld;
    controlling the welding force by directly controlling the setting of said pressure regulating valve, by means of a control signal determined by said welding force control variable and applied to said pressure regulating valve, and;
    controlling other control variables of welding operation including squeeze time, welding time, hold time, OFF time, cooling time, and welding current.

2. A method according to claim 1, including varying the control signal applied to said pressure regulating valve sequentially with time according to the thickness of said workpiece, said varying including varying at least one of current, voltage or pulses.

3. A method according to claim 1, including varying the control signal applied to said pressure regulating valve sequentially with time according to the quality of said workpiece, said varying including varying at least one of current, voltage or pulses.

4. A method according to claim 1, including regulating the control signal applied to said pressure regulating valve in a single step in one welding cycle.

5. A method according to claim 1, including regulating the control signal applied to the pressure regulating valve in a plurality of steps in one welding cycle.

6. A method according to claim 1, in which controlling step includes using a controller preprogrammed with said schedule and therewith causing the pressure regulating valve to automatically and steplessly regulate the fluid under pressure applied thereto in accordance with said preprogrammed schedule including the alternatives of regulating the fluid under pressure to a desired low pressure or high pressure in one welding cycle, or regulating the fluid under pressure to a desired pressure in each welding step, or regulating the fluid under pressure to a desired pressure in a group of welding cycles.

7. A welding machine control apparatus for controlling the welding operation of a welding machine, comprising:
   a compressed air source;
   a power cylinder actuable to set the welding force at weld electrode means;
   a reversing valve operatively connecting said power cylinder to said compressed air source for supplying air under pressure to said cylinder;
   a pressure regulating valve connected between said compressed air source and reversing valve for varying the air pressure applied to said reversing valve; and
   a controller means preprogrammed with a predetermined schedule of variations in the welding force control variable to vary the welding force applied to a workpiece during a weld or series of welds, said controller means directly controlling said pressure regulating valve via a control signal varying with said preprogrammed schedule of variations in said welding force control variable, said controller means also controlling other welding operation control variables including squeeze time, welding time, hold time, OFF time, cooling time, and welding current by outputs to said reversing valve and weld electrode means.

8. Apparatus according to claim 7, including means applying said control signal from said controller means to said pressure regulating valve for varying the magnitude of current, voltage or pulses applied to said pressure regulating valve sequentially with time according to the thickness of said workpiece.

9. Apparatus according to claim 7, including means applying said control signal from said controller means to said pressure regulating valve for varying the magnitude of current, voltage or pulses applied to said pressure regulating valve sequentially with time according to the quality of said workpiece.

10. Apparatus according to claim 7, including means applying said control signal from said controller means to said pressure regulating valve wherein the control signal applied to said pressure regulating valve is regulated in a single step in one welding cycle.

11. Apparatus according to claim 7, including means applying said control signal from said controller means to said pressure regulating valve wherein the control signal applied to the pressure regulating valve is regulated in a plurality of steps in one welding cycle.

* * * * *